(12) United States Patent
Hackworth et al.

(10) Patent No.: US 8,261,821 B2
(45) Date of Patent: Sep. 11, 2012

(54) DOWNHOLE MULTI-PARALLEL HYDROCYCLONE SEPARATOR

(75) Inventors: Matthew Hackworth, Manvel, TX (US); Brigitte Finkiewicz, Rosharon, TX (US); Dwayne Cartier, Beaumont (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 224 days.

(21) Appl. No.: 12/640,034

(22) Filed: Dec. 17, 2009

(65) Prior Publication Data

US 2011/0146976 A1    Jun. 23, 2011

(51) Int. Cl.
   *E21B 43/38* (2006.01)
(52) U.S. Cl. ........................................................ 166/265
(58) Field of Classification Search .................. 166/265; 210/512.1, 512.2, 170.01, 788, 747.1
   See application file for complete search history.

(56) References Cited

U.S. PATENT DOCUMENTS 6,017,456 A * 1/2000 Kennedy et al. .............. 166/265
6,627,081 B1    9/2003 Hilditch et al.

* cited by examiner

*Primary Examiner* — Brad Harcourt
(74) *Attorney, Agent, or Firm* — Jim Patterson

(57) ABSTRACT

A hydrocyclone separator assembly includes a longitudinal housing configured for disposal in a wellbore, wherein the longitudinal housing comprises a discharge head disposed at one end of the longitudinal housing, wherein the discharge head includes at least one overflow port and at least one underflow port; a plurality of hydrocyclones disposed arranged in a same orientation in the longitudinal housing, wherein the plurality of hydrocyclone each comprise an overflow exit and an underflow exit, wherein at least two of the overflow exits of the plurality of hydrocyclones are connected to a common tubing that is connected to the at least one overflow port on the discharge head, wherein at least two of the underflow exits of the plurality of hydrocyclones are connected to separate tubings that are connected to the at least one underflow port on the discharge head.

11 Claims, 3 Drawing Sheets

DOWNHOLE MULTI-PARALLEL HYDROCYCLONE SEPARATOR

BACKGROUND OF DISCLOSURE

1. Field of the Disclosure

This invention relates generally to multi-parallel hydrocyclone separators for use in downhole applications for separating multi-phase mixtures. More specifically, this invention relates to multi-parallel hydrocyclone separators for use in downhole applications for separating oil and water in a production flow from a subterranean hydrocarbon reservoir.

2. Background Art

Many oil wells produce hydrocarbons with high percentage of water and require systems to separate water from hydrocarbons. In typical practice, a produced mixture is lifted to the surface and the water is separated from the hydrocarbon in a surface processing station for subsequent water discharge into the environment. There is significant energy wastage and increased operating costs associated with transporting downhole fluids to the surface processing station for separation.

Hydrocyclones, which are compact, centrifugal separators, separate components of a mixture according to the relative densities of the components. For example, hydrocyclones may be used to separate solids, liquids, and gases. Similarly, hydrocyclones may be used to separate different components in a fluid mixture, for example oils and water, based on different densities. Hydrocyclones are widely used in both onshore and offshore oil production in above-ground applications, such as bulk water knockout from production fluids, or for downhole de-oiling produced water prior to water reinjection into a formation or water disposal to a disposal site.

Hydrocyclone separators are able to continuously separate a production fluid into a heavy phase and a light phase using centrifugal forces created when a production liquid stream is provided into a conically shaped cyclone at a high speed in a substantially tangential direction. The liquid swirls around the inside of the hydrocyclone at a high speed to create a centrifugal force on the liquid. Typically, hydrocyclones are designed to provide a centrifugal force that is much greater, perhaps several hundred folds greater, than the gravitational force on the liquid, such that the effects of gravity on the liquid are negligible. Under these conditions, the heavy liquid is forced to the outer wall of the hydrocyclone, thereby forcing the light phase liquid toward the center of the hydrocyclone. The heavier phase moving along the wall of the conical hydrocyclone will migrate towards the end with the small diameter (the tail), while the lighter phase in the center will be pushed towards the end with the larger diameter (the head).

The use of hydrocyclones to separate oil and water from the production flow of an oil well is well known. Downhole oil/water separation technology enables separation of oil and water in the well bore, wherein the oil-enriched fluid is transported to the surface and the water-enriched fluid may be injected back into a formation above or below the production zone without being transported to the surface.

Hydrocyclones may include bulk oil/water separators designed to operate on mixtures with a relatively high concentration of oil in water; pre-de-oiler separators designed to separate oil from a mixture with a lower concentration of oil (for example the water and oil mixture discharged from a bulk oil/water separator); and de-oiler separators designed to separate oil from a mixture containing a relatively low concentration of oil in water in order to discharge substantially clean water into the environment.

Hydrocyclone separators typically require connecting multiple hydrocyclones in parallel in order to achieve significant flow rates. On surface, multiple (sometimes dozens) of hydrocyclone separators may be connected to a single manifold, which evenly splits the flow to each hydrocyclone. However, this approach is not practical in a downhole tool due to space limitation.

When packaging hydrocyclones for downhole applications, space constraints require that a novel approach be taken to assemble hydrocyclones in the limited space. There have been a number of prior proposals for hydrocyclone separation systems for use in downhole operations. Generally, such systems comprise an outer tubular housing dimensioned to fit within a casing of an oil well. The housing provides a supporting structure for securing a plurality of hydrocyclones therein. Complex piping within the housing communicates with the outlets of the hydrocyclones so that the separated water can be re-injected into the environment, and an oil-rich mixture resulting from the removal of water may be transported to the surface.

For example, U.S. Pat. No. 6,627,081, issued to Hilditch et al. discloses a hydrocyclone assembly having multiple hydrocyclones disposed in a housing, wherein the outlets of hydrocyclones are connected via connecting unions to overflow and underflow passages in the housing. The multiple hydrocyclones may be arranged in opposite orientation to maximize the utilization of the limited space.

When packaging multiple hydrocyclones for downhole applications, managing various flows into and out of hydrocyclone separation systems is critical. This may involve properly managing the additive fluid velocities coming from multiple hydrocyclones to prevent erosion and properly balance the input to each hydrocyclone. There is still a need for better hydrocyclone separation assemblies for downhole use.

SUMMARY OF THE INVENTION

In one aspect, the present invention provides for hydrocyclone separator assemblies. A hydrocyclone separator assembly in accordance with one embodiment of the invention includes a longitudinal housing configured for disposal in a wellbore, wherein the longitudinal housing comprises a discharge head disposed at one end of the longitudinal housing, wherein the discharge head includes at least one overflow port and at least one underflow port; a plurality of hydrocyclones disposed arranged in a same orientation in the longitudinal housing, wherein the plurality of hydrocyclone each comprise an overflow exit and an underflow exit, wherein at least two of the overflow exits of the plurality of hydrocyclones are connected to a common tubing that is connected to the at least one overflow port on the discharge head, wherein at least two of the underflow exits of the plurality of hydrocyclones are connected to separate tubings that are connected to the at least one underflow port on the discharge head.

Another aspect of the invention relates to processes for separating a mixture. A process in accordance with one embodiment of the invention includes delivering the mixture to a separator assembly that comprises: a longitudinal housing configured for disposal in a wellbore, wherein the longitudinal housing comprises a discharge head disposed at one end of the longitudinal housing, wherein the discharge head includes at least one overflow port and at least one underflow port, a plurality of hydrocyclones disposed arranged in a same orientation in the longitudinal housing, wherein the plurality of hydrocyclone each comprise an overflow exit and an underflow exit, wherein at least two of the overflow exits of the plurality of hydrocyclones are connected to a common tubing that is connected to the at least one overflow port on the discharge head, wherein at least two of the underflow exits of the plurality of hydrocyclones are connected to separate tubings that are connected to the at least one underflow port on the discharge head; and separating the mixture in the separator assembly into an overflow component and a underflow component.

Other aspects and advantages will be apparent from the following description and the appended claims.

DETAILED DESCRIPTION

In one aspect, embodiments disclosed herein relate to multi-parallel hydrocyclone separators for use in downhole applications for separating multi-phase mixtures or for separating components of different densities in a fluid. As used herein, "multi-phase mixtures" refers to mixtures including two or more components in a fluid or two or more phases including solids, liquids, and/or vapors or combinations thereof.

When packaging hydrocyclones for downhole applications, managing significant flow into and out of hydrocyclone separation systems in a confined space is necessary. In accordance with embodiments of the present invention, to achieve significant flow rates into and out of hydrocyclone separator systems, multiple hydrocyclones are connected in the same orientation and the plumbing is designed to properly manage the fluid flows coming from multiple hydrocyclones in order to prevent erosion and properly balance the performance of each hydrocyclone.

Figures 1A, 1B:
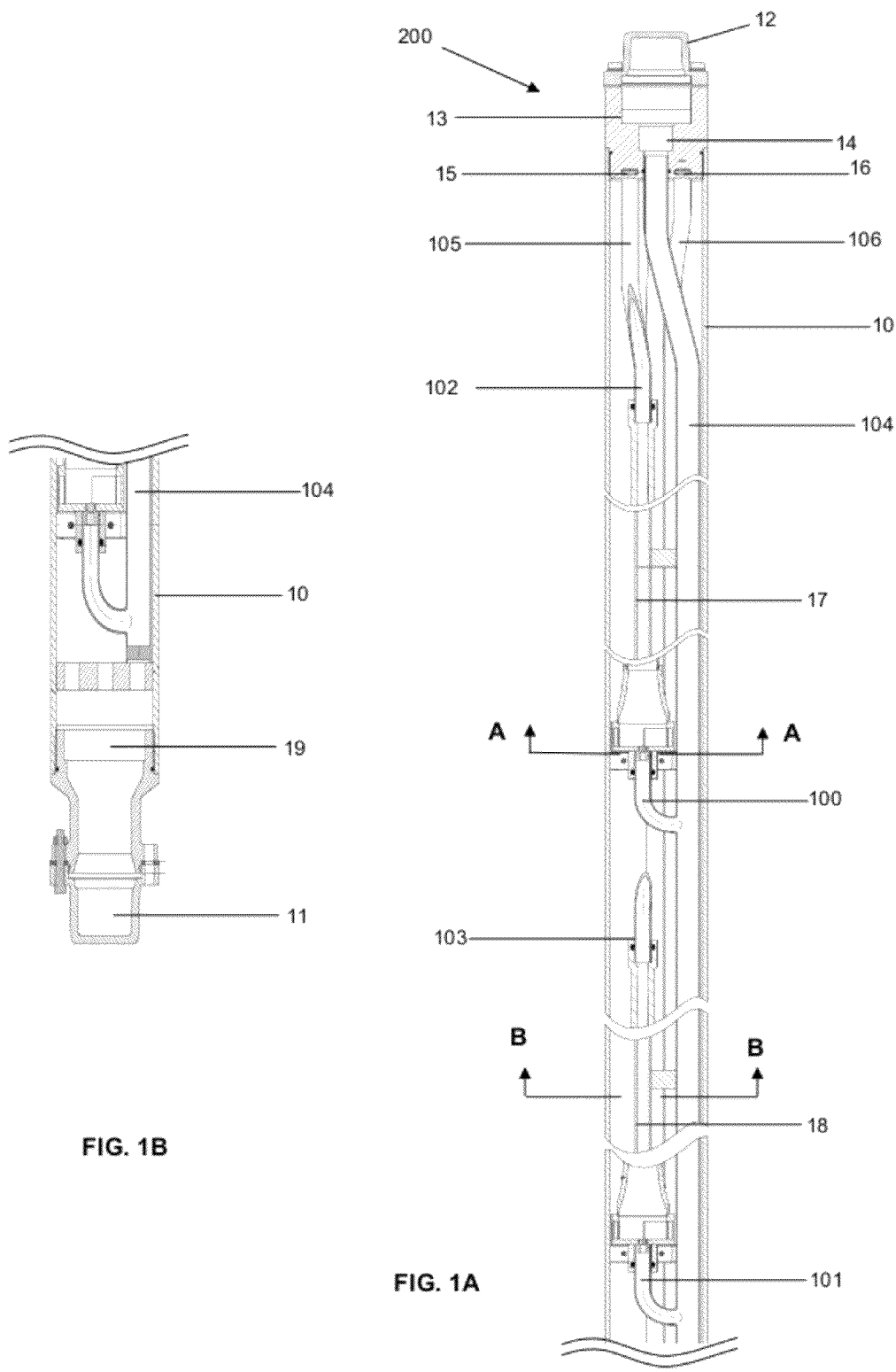
FIG. 1 is a diagrammatic perspective view of multi-parallel hydrocyclone separator assembly according to one embodiment of the invention.

In accordance with one embodiment of the invention, as illustrated in FIG. 1A and FIG. 1B. FIG. 1A and FIG. 1B represent two sections of a longer assembly 200 that includes five hydrocyclones arranged longitudinally. As illustrated in FIG. 1A and FIG. 1B, a separator assembly 200 includes a housing 10 having a housing inlet end 11 for receiving a fluid mixture and an outlet end 12 that includes a discharge head 13 having an overflow port 14 and two underflow ports 15 and 16. In this illustration, only two underflow ports 15 and 16 are shown. However, in a separator assembly with more hydrocyclones, there may be more overflow ports, as explained below.

Inside housing 10, two hydrocyclones 17 and 18 are shown and arranged in the same orientation for separating the fluid mixture. "In the same orientation" or "oriented in the same direction" means the hydrocyclones have their overflow exits generally face the same end of the separator assembly (the tool), while all their underflow exits generally face the other end of the tool. However, it is unnecessary that these hydrocyclones all lined up in the same direction. In other words, some hydrocyclones may "tilt" with respect to others, as long as they are arranged generally in the same orientation—e.g., their overflow exits all point to the same end of the tool. In an assembly with more hydrocyclones, they will be arranged in a similar manner. Each hydrocyclone is located in the housing 10 between the housing inlet end 11 and housing outlet end 12.

Each hydrocyclone may share an inlet 19 fluidly connected to the housing inlet end 11. Hydrocyclones 17, 18 have overflow exits 100 and 101 for withdrawing overflow fractions and underflow exits 102 and 103 for withdrawing underflow fractions. The overflow exits 100 and 101 of hydrocyclones 17 and 18 are connected into a tubing 104, which leads to the overflow port 14 on the discharge head 13. The underflow exits 102 and 103 of hydrocyclones 17 and 18 are fluidly connected to tubings 105 and 106, respectively. The tubing 105 and 106 from underflow exits 102 and 103 are fluidly connected to the underflow ports 15 and 16 on the discharge head 13, respectively.

Thus, a mixture enters the hydrocyclone separators 17 and 18 through the housing inlet end 11 fluidly connected to the inlet 19. The mixture flows through the hydrocyclone separators 17 and 18 and is separated in a known manner based on the relative densities of the components to provide, for example, an oil-rich flow at the overflow exits 100 and 101 and a water-rich flow at the underflow exits 102 and 103 of hydrocyclone separators 17 and 18. The oil-rich flow is transported to the overflow port 14 on the discharge head 13 by means of the overflow tubing 104, and the water-rich flow is transported to the underflow ports 15 and 16 by means of separate tubings 105 and 106. The underflow may contain sufficiently small quantity of oil for the underflow to be returned to a suitable stratum of the well for disposal or for use in well pressure maintenance.

Note that, in the embodiment illustrated in FIGS. 1A and 1B, both overflow (e.g., hydrocarbons) and underflow (e.g., water) will exit the separator assembly 200 from the same end (i.e., the outlet end 12). Furthermore, the underflows from individual hydrocyclones have separate tubings 105 and 106 leading to the discharge head 13, while the overflows from individual separators are connected into the same tubing 104 to the discharge head 13. This configuration is advantageous based on engineering economy and fluid dynamic consideration because the underflow (e.g., water) is typically relatively dense and more viscous, as compared to the overflow (e.g., hydrocarbons). While there are only two hydrocyclone separators illustrated in FIGS. 1A and 1B, embodiments of the invention can have more than two separators in an assembly. For example, in some embodiments, a separator assembly may include three, four, five, or more hydrocyclones.

Figure 2:
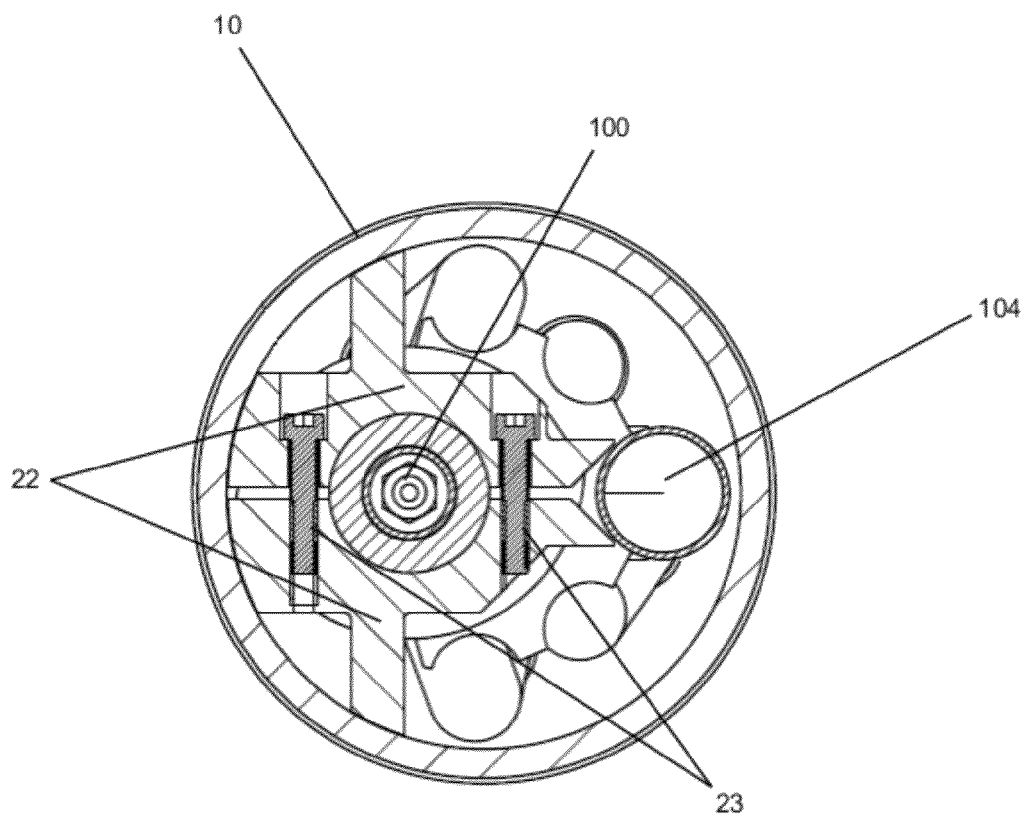
FIG. 2 is a cross-sectional diagrammatic perspective view of the hydrocyclone of FIG. 1 along A-A.

FIG. 2 shows a cross-sectional view, along A-A, of the hydrocyclone separator assembly illustrated in FIG. 1A. The separator assembly has a housing 10 that comprises a generally longitudinally extending tube. The cross-section shows one hydrocyclone overflow exit 100. The hydrocyclone, for example, may be held in place with adjustable clamps 22 or equivalents thereof, wherein the adjustable clamps may be adjusted, for example, by bolts 23 or equivalents thereof. The cross section also shows one common tubing 104 for the overflows and four channels for underflow tubings.

In accordance with some embodiments of the invention, not all underflows from all hydrocyclones need to have separate underflow tubings to the discharge head. Some of them may share one tubing. Similarly, not all overflows from all the hydrocyclones need to share a common tubing to the discharge head. For example, a separator assembly with five hydrocyclones may have two shared overflow tubings and/or three or four underflow tubings. In general, because the overflow fluids (e.g., hydrocarbons) are relatively less demanding (in terms of hydrodynamics), they can often share a common tubing. On the other hand, it would be advantageous to have separate tubings for the underflows (e.g., water). On skilled in the art would appreciate that any configuration may be optimized based on engineering and hydrodynamic considerations.

Figure 3:
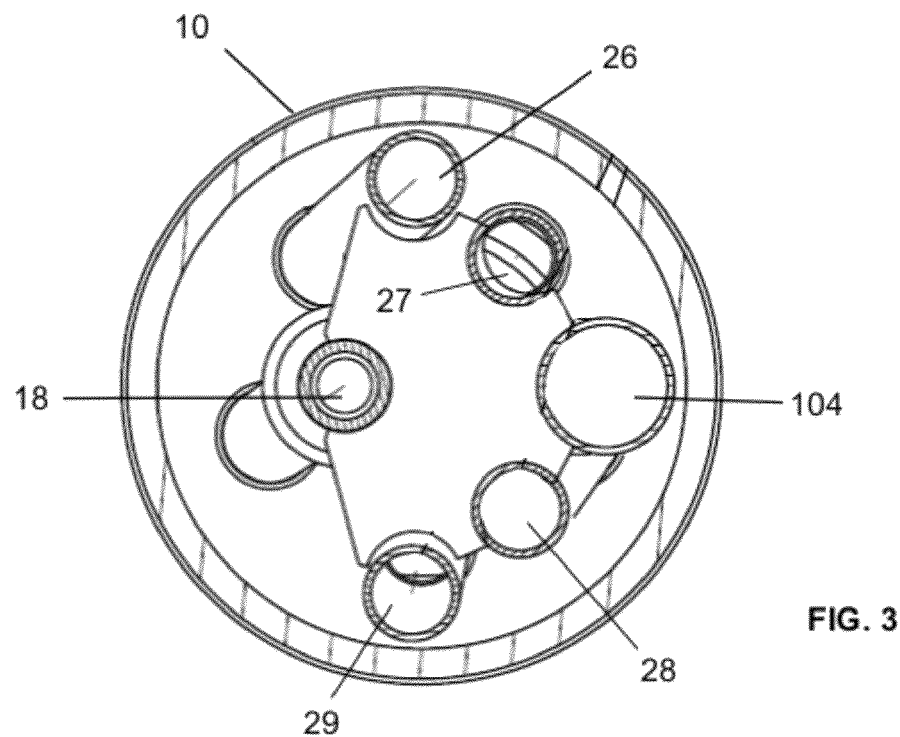
FIG. 3 is another cross-sectional diagrammatic perspective view of the hydrocyclone of FIG. 1 along B-B.

FIG. 3 shows another cross-sectional view (for example, along B-B) of the hydrocyclone separator assembly 200 illustrated in FIG. 1A. As shown in FIG. 3, the separator assembly includes a housing 10. The cross-section shows one hydrocyclone 18, four underflow tubings 26-29 and one overflow tubing 104.

In accordance with embodiments of the invention, a hydrocyclone separator assembly may be used to separate a multiphase mixture from a subterranean formation. The hydrocyclone separator assembly may include two or more hydrocyclones located within a housing having an inlet configured to be fluidly connected to a discharge of an electric submersible pump (ESP). The mixture may be delivered from the ESP to the housing inlet, which is fluidly connected to the inlet of the hydrocyclone separator assembly. The mixture is then separated into separate components based on the relative densities of the components and discharged from the discharge head at the outlet end of the assembly.

Figure 4:
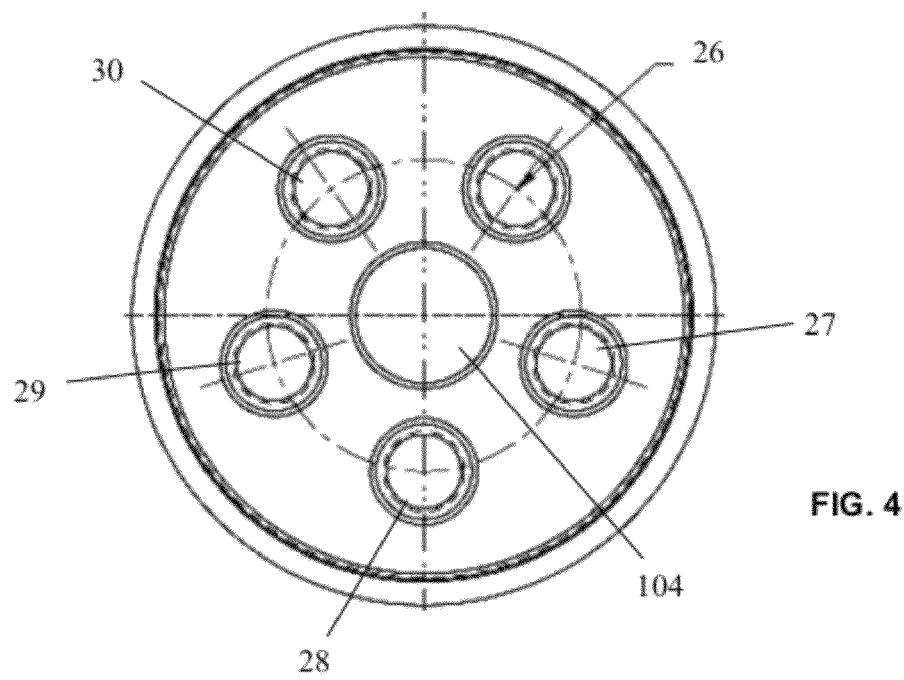
FIG. 4 shows a discharge head in accordance with one embodiment of the invention.

In accordance with some embodiments of the invention, a discharge head may include one port located proximate a center of the discharge head and other ports arranged around the center port. Alternatively, all ports may be arranged around the periphery of the discharge head. In some embodiments, the discharge head may include an overflow port located proximate a center of the discharge head and two or more underflow ports spaced circumferentially around the overflow port. For example, FIG. 4 shows a particular embodiment, in which the discharge head includes one overflow port 41 located proximate a center of the discharge head and five underflow ports 42-46 spaced circumferentially around the overflow port. In accordance with some embodiments of the invention, the discharge head may include more than one overflow port and a plurality of underflow ports.

In accordance with embodiments of the invention, a hydrocyclone separator assembly comprises at least two hydrocyclone separators arranged in the same orientation. For example, a hydrocyclone separator assembly of the invention may comprise from 2 to 5 or more hydrocyclone separators. In some embodiments, a hydrocyclone may be configured to operate as a pre-de-oiler, bulk oil/water separator or a de-oiler.

Advantages of the invention may include one or more of the following. Embodiments of the invention relate to downhole tools having multiple hydrocyclones, in which the multiple hydrocyclones are arranged in the same orientation—i.e., all inlet ends of the hydrocyclones face the same end of the assembly. In addition, the associated plumbings (e.g., the underflow tubings) for these multiple hydrocyclones are also oriented in the same direction. In accordance with embodiments of the invention, the water and oil both exit from the same end of the assembly, e.g., the outlet end of the assembly. This configuration has engineering and fluid dynamic advantages.

In contrast, a conventional multiple hydrocyclone tool (e.g., that disclosed in the U.S. Pat. No. 6,627,081) has the oil coming out from one end of the tool (assembly) and the water from the other end. Consequently, the oil stream must make a 180-degree turn after leaving the hydrocyclone because one would never want to make the water turn 180 degrees for various engineering reasons.

In accordance with embodiments of the invention, all oil outlets from the hydrocyclones may be tied together into a single tube before they exit the tool. This has the engineering simplicity. On the other hand, all water outlets from the hydrocyclones exit the tool in separate tubes. This is also advantageous because water is relatively dense and more viscous, which would have more impact on the performance of the hydrocyclones. In accordance with some embodiments of the invention, the "body" or housing of a tool is not used as a hydraulic conduit. Instead, all fluids may be handled in individual tubes. These features provide desirable engineering and fluid dynamic properties to enhance the performance of the hydrocyclones.

While the above description includes a limited number of examples, those skilled in the art, having benefit of this disclosure, would appreciate that other embodiments may be devised which do not depart from the scope of the invention. Accordingly, the scope of the invention should be limited only by the attached claims.

What is claimed is:

1. A hydrocyclone separator assembly, comprising:
a longitudinal housing configured for disposal in a wellbore, wherein the longitudinal housing comprises a discharge head disposed at one end of the longitudinal housing, wherein the discharge head includes at least one overflow port and at least one underflow port;
a plurality of hydrocyclones disposed arranged in a same orientation in the longitudinal housing, wherein the plurality of hydrocyclone each comprise an overflow exit and an underflow exit, wherein at least two of the overflow exits of the plurality of hydrocyclones are connected to a common tubing that is connected to the at least one overflow port on the discharge head, wherein at least two of the underflow exits of the plurality of hydrocyclones are connected to separate tubings that are connected to the at least one underflow port on the discharge head.

2. The hydrocyclone separator assembly of claim 1, wherein one end of the housing is configured to be fluidly connected to a discharge of an electric submersible pump (ESP).

3. The hydrocyclone separator assembly of claim 1, wherein the discharge head comprises an overflow port and a plurality of underflow ports.

4. The hydrocyclone separator assembly of claim 3, wherein the overflow port is located proximate a center of the discharge head and the plurality of underflow ports are spaced circumferentially around the overflow port.

5. The hydrocyclone separator assembly of claim 1, wherein the hydrocyclone separator assembly comprises two to five hydrocyclones.

6. The hydrocyclone separator assembly of claim 1, wherein said hydrocyclone separator assembly comprises five hydrocyclones.

7. The hydrocyclone separator assembly of claim 1, wherein said hydrocyclone separator assembly is configured to operate as a pre-de-oiler, a bulk water/oil separator, a de-oiler, or combinations thereof.

8. A process for separating a mixture, comprising:

delivering the mixture to a separator assembly that comprises:

a longitudinal housing configured for disposal in a wellbore, wherein the longitudinal housing comprises a discharge head disposed at one end of the longitudinal housing, wherein the discharge head includes at least one overflow port and at least one underflow port, a plurality of hydrocyclones disposed arranged in a same orientation in the longitudinal housing, wherein the plurality of hydrocyclone each comprise an overflow exit and an underflow exit, wherein at least two of the overflow exits of the plurality of hydrocyclones are connected to a common tubing that is connected to the at least one overflow port on the discharge head, wherein at least two of the underflow exits of the plurality of hydrocyclones are connected to separate tubings that are connected to the at least one underflow port on the discharge head; and separating the mixture in the separator assembly into an overflow component and a underflow component.

9. The process of claim 8, wherein the mixture is delivered to an inlet of the longitudinal housing from an electric submersible pump (ESP).

10. The process of claim 8, further comprising transporting the underflow component from the separator assembly outlet to a remote location.

11. The process of claim 10, wherein the remote location is a downhole disposal site.

* * * * *